United States Patent Office 3,510,484
Patented May 5, 1970

3,510,484
PHOSPHORIC (-PHOSPHONIC) AND THIONO-PHOSPHORIC (-PHOSPHONIC) ACID ESTERS
Karl - Julius Schmidt, Wuppertal - Vohwinkel, Ingeborg Hammann, Cologne, and Günter Unterstenhöfer, Opladen, Germany, assignors to Farbenfabriken Bayer Aktiengesellschaft, Leverkusen, Germany, a corporation of Germany
No Drawing. Filed July 12, 1968, Ser. No. 744,331
Claims priority, application Germany, Aug. 1, 1967,
F 53,122
Int. Cl. C07d 55/10; A01n 9/22
U.S. Cl. 260—248                9 Claims

ABSTRACT OF THE DISCLOSURE (Alkyl, phenyl and O-alkyl)-O-alkyl-O-(benzo-1,2,4-triazin-3-yl)-(phosphoric and phosphonic) and thiono-(phosphoric and phosphonic) acid esters which possess arthropodicidal, especially acaricidal and insecticidal, properties and which may be produced by reacting the corresponding phosphoric (phosphonic) and thiono-phosphoric (-phosphonic) acid ester halide with 3-hydroxy-benzo-1,2,4-triazine.

---

The present invention relates to and has for its objects the provision for particular new phosphoric (phosphonic) and thiono-phosphoric (-phosphonic) acid esters of 3-hydroxy-benzo-1,2,4-triazines which possess arthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g., arthropods, with other and further objects becoming apparent from a study of the within specification and accompanying examples.

In German Patent 927,270 thiophosphoric acid esters of N-methyl-benzaimides are already described, while there are known from German Patent 1,115,738, open-chain and cyclic quinoxalino-2,3-thiophosphoric acid esters which, by reason of their good insecticidal and acaricidal properties, are used as pesticides. These last-mentioned esters, however, either have the disadvantage that they are less effective against resistant spider mites or that their production presents technological difficulties.

It has been found in accordance with the present invention that the particular new phosphoric (phosphonic) and thionophosphoric (-phosphonic) acid esters of 3-hydroxy-benzo - 1,2,4 - triazines, i.e. (alkyl, phenyl and O-alkyl)-O-alkyl-O-(benzo - 1,2,4 - triazin-3-yl)-(phosphoric and phosphonic) and thiono-(phosphoric and phosphonic) acid esters, having the formula

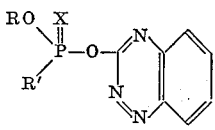

(I)

in which R is alkyl having 1–4 carbon atoms, R′ is selected from the group consisting of alkyl having 1–4 carbon atoms, alkoxy having 1–4 carbon atoms, and phenyl, and X is selected from the group consisting of oxygen and sulfur, exhibit strong arthropodicidal, especially insecticidal and acaricidal, properties.

It has been furthermore found in accordance with the present invention that a versatile and smooth process for the production of the particular new phosphoric and phosphonic and thiono-phosphoric and -phosphonic acid esters of 3-hydroxy-benzo-1,2,4-triazines of Formula I above in favorable yields may be provided, which comprises reacting 3-hydroxy-(benzo-1,2,4-triazine) having the formula

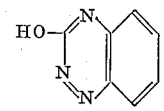

(IIa)

with the corresponding phosphoric, phosphonic or thiono-phosphoric (-phosphonic) acid ester halide having the formula

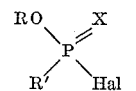

(IIb)

in which R, R′ and X are the same as defined above, and Hal is a halogen atom, especially chloro or bromo.

The particular new esters of Formula I above exhibit, as has further been found, strong insecticidal and acaricidal properties. They possess an excellent activity against eating and sucking insects, ticks and, in particular, against resistant spider mites. These compounds are in this respect clearly superior to the known products of comparable constitution and type of activity and therefore the instant compounds represent a genuine enrichment of the art.

The process for producing the particular new compounds according to the present invention is illustrated by the following typical reaction scheme:

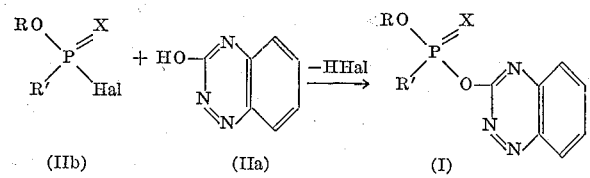

(IIb)            (IIa)            (I)

the symbols R, R′, X and Hal being the same as defined above.

The 3-hydroxy-benzo-1,2,4-triazine and the corresponding phosphorus acid ester halides necessary as starting materials for carrying out the process according to the present invention are known from the literature.

The production process according to the present invention is carried out preferably in the presence of suitable inert solvents (this term includes mere diluents). As such, practically all inert organic solvents or mixtures thereof are suitable, such as hydrocarbons, e.g., benzine, benzene, toluene, chlorobenzene, xylene; ethers, for example diethyl and dibutyl ether, dioxan; ketones, e.g., acetone, methylethyl, methylisopropyl and methylisobutyl ketone. However, particularly good results have been obtained with low-boiling aliphatic alcohols, for example methanol and ethanol, and even better results with nitriles, e.g., acetonitrile and propionitrile, and dimethyl formamide.

Moreover, the reaction according to the instant process is preferably carried out in the presence of acid acceptors. For this purpose, practically all customary acid-binding agents can be used. Particularly suitable are: alkali metal alcoholates and carbonates, such as potassium and sodium methylate or ethylate, sodium and potassium carbonate, and tertiary aromatic or heterocyclic amines, e.g., triethyl amine, dimethyl aniline or pyridine.

The reaction temperature can be varied within a fairly wide range. In general, the reaction is carried out at substantially between about 20 to 120° C. (or the boiling point of the mixture), preferably at about 40 to 80° C. The starting materials to be reacted according to such process, as well as the auxiliary materials (acid-binding agents), are, in general, used in stoichiometric amounts. After combining the starting components it is advantageous, in order to complete the reaction to continue heating the mixture for a longer period (about ½ to 3 hours), optionally with stirring. With this method of working, the products are obtained with outstanding yields and in excellent purity.

The particular new phosphoric and thiono-phosphoric (-phosphonic) acid esters of 3-hydroxy-benzo-1,2,4-triazine which are obtainable according to the instant process are obtained in most cases as colorless crystals with sharp melting points which, if necessary, can readily be further purified by recrystallization from the usual solvents. Some of the instant products are obtained in the form of colorless to yellow-colored, viscous, water-insoluble oils which cannot be distilled without decomposition but which can be freed from the last volatile components by so-called slight distillation, i.e., longer heating to moderately elevated temperatures under reduced pressure, and in this way be purified. For their more precise characterization, the determination of the refractive index can be used.

As already mentioned above, the instant compounds are distinguished by outstanding insecticidal and acaricidal effectiveness. They possess at the same time only a low toxicity to warm-blooded animals and a concomitantly low phytotoxicity. The action sets in rapidly and is long-lasting. For this reason, the particular new compounds which can be prepared according to the present invention can be used with success in plant protection for the control of noxious sucking and eating insects and Diptera as well as against mites (Acarina).

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*, and the like.

In the case of the biting insects contemplated herein, above all there should be mentioned butterfly caterpillars (Lepidoptera) such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygm frugiperda*) and cotton worm (*Prodenia litura*), the ermine moth (*Hyponomeuta padella*), the Mediterranean flour moth (*Epestia kuhniella*) and greater wax moth (*Galleria mellonella*); and the like. Also to be classed with the biting insects contemplated herein are beetles (Coleoptera), for example the granary weevil (*Sitophilius granarius-Calandra granaria*), the Colorado beetle (*Leptinotarsa decemlineata*), the dock beetle (*Gastrophysa viridula*), the mustard beetle (*Phaedon cochelearia*), the blossom beetle (*Meligethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilius surinamensis*), but also species living in the soil, for example wireworms (*Agriotes* spec.) and larvae of the cockchafer (*Melolontha melolontha*); cockroaches, such as the German cockroach (*Blattela germanica*), American cockroach (*Periplaneta americana*), Maderia cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius-Tetranychus althaeae* or *Tetranychus urticae*) and the European red mite (*Paratetranychus pilosus-panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with diluents or extenders, i.e., dispersible carrier vehicles, such as solutions, emulsions, suspensions, emulsifiable concentrates, spray powders, pastes, soluble powders, dusting agents, granules, etc. These are prepared in known manner, for instance by extending the active compounds with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as carrier vehicle assistants, e.g., surface-active agents, for this purpose: emulsifying agents, such as nonionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001 and 20%, preferably 0.01–5%, by weight of the mixture. Thus, the present invention contemplates overall compositions which comprise mixtures of a dispersible carrier vehicle such as (1) a dispersible inert finely divided carrier solid, and/or (2) a dispersible carrier liquid such as an inert organic solvent and/or water preferably including a surface-active amount of a carrier vehicle assistant, e.g. surface-active agent, such as an emulsifying agent and/or a dispersing agent, and an amount of the active compound which is effective for the purpose in question and which is generally between about 0.00001 and 95%, and preferably 0.01–95%, by weight of the mixture.

The active compounds can also be used in accordance with the well known ultra-low-volume process with good success, i.e., by applying such compound if normally a liquid, or by applying a liquid composition containing the same, via very effective atomizing equipment in extremely finely divided form, i.e., mist form, for example by airplane crop spraying techniques. Only a few liters/hectare are needed, and often amounts up to about 1 quart/acre, preferably 2–16 fluid ounces/acre, are sufficient. In this process it is possible to use highly concentrated liquid compositions with said liquid carrier vehicles containing from about 40 to about 95% by weight of active compound or even the 100% active substance alone, e.g., about 40–100% by weight of the active compound.

In particular, the present invention contemplates methods of selectively controlling or combating pests, e.g. arthropods, i.e., insects and acarids, and more particularly, methods of combating at least one of insects and acarids which comprises applying to at least one of correspondingly (a) such insects, (b) such acarids, and (c) the corresponding habitat, i.e., the locus to be protected, a correspondingly combative amount, i.e., an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

The outstanding activity of the particular new compounds of the present invention is illustrated without limitation by the following examples:

EXAMPLE 1

*Tetranychus test.*—Solvent: 3 parts by weight acetone; emulsifier: 1 part by weight alkylaryl polyglycol ether.

To produce a suitable preparation of the particular active compound, 1 part by weight of such active compound is mixed with the stated amount of solvent containing the stated amount of emulsifier and the concentrate so obtained is diluted with water to the desired final concentration.

Bean plants (*Phaseolus vulgaris*), which have a height of approximately 10–30 cm., are sprayed with the active compound preparation until dripping wet. These bean plants are heavily infested with spider mites (*Tetranychus telarius*) in all stages of development.

After the specified period of time, the effectiveness of the given active compound preparation is determined by counting the dead mites. The degree of destruction thus obtained is expressed as a percentage: 100% means that all the spider mites are killed whereas 0% means that none of the spider mites are killed.

The particular active compounds tested, their concentrations, the evaluation time and the results obtained can be seen from the following Table 1:

TABLE 1

| Active compound (constitution) | Concentration of active compound in percent | Degree of destruction in percent after 2 days |
|---|---|---|
| (A) 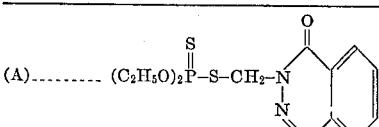 (Known comparative preparation) | 0.1<br>0.01 | 100<br>0 |
| (III₁) 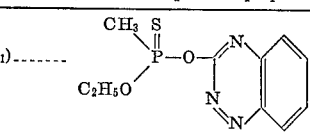 | 0.1<br>0.01 | 100<br>70 |
| (IV₁) 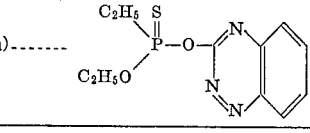 | 0.1<br>0.01 | 100<br>100 |
| (V₁) 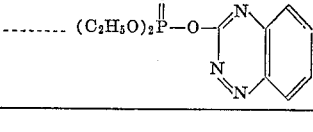 | 0.1<br>0.01 | 100<br>98 |

EXAMPLE 2

*Myzus test (contact action).*—Solvent: 3 parts by weight acetone; emulsifier: 1 part by weight alkylaryl polyglycol ether.

To produce a suitable preparation of the particular active compound, 1 part by weight of such active compound is mixed with the stated amount of solvent containing the stated amount of emulsifier and the resulting concentrate is diluted with water to the desired final concentration.

Cabbage plants (*Brassica oleracea*) which have been heavily infested with peach aphids (*Myzus persicae*) are sprayed with the given active compound preparation until dripping wet.

After the specified period of time, the degree of destruction is determined as a percentage: 100% means that all the aphids are killed whereas 0% means that none of the aphids are killed.

The particular active compounds tested, their concentrations, the evaluation time and the results obtained can be seen from the following Table 2:

TABLE 2

| Active compound (constitution) | Concentration of active compound in percent | Degree of destruction in percent after 24 hours |
|---|---|---|
| (A) $(C_2H_5O)_2\overset{S}{\overset{\|}{P}}-S-CH_2-N\underset{N}{\overset{\overset{O}{\|}}{\diagup}}$ (Known comparative preparation) | 0.1<br>0.01 | 100<br>40 |
| (III$_2$) $\underset{C_2H_5O}{\overset{CH_3}{\diagdown}}\overset{S}{\overset{\|}{P}}-O-\underset{N}{\overset{N}{\diagup}}\underset{\diagdown N}{}$ | 0.1<br>0.01 | 100<br>100 |
| (IV$_2$) $\underset{C_2H_5O}{\overset{C_2H_5}{\diagdown}}\overset{S}{\overset{\|}{P}}-O-\underset{N}{\overset{N}{\diagup}}\underset{\diagdown N}{}$ | 0.1<br>0.01<br>0.001 | 100<br>100<br>80 |
| (VI$_1$) $(C_2H_5O)_2\overset{S}{\overset{\|}{P}}-O-\underset{N}{\overset{N}{\diagup}}\underset{\diagdown N}{}$ | 0.1<br>0.01 | 100<br>100 |
| (V$_2$) $(C_2H_5O)_2\overset{O}{\overset{\|}{P}}-O-\underset{N}{\overset{N}{\diagup}}\underset{\diagdown N}{}$ | 0.1<br>0.01<br>0.001 | 100<br>100<br>50 |

EXAMPLE 3

*Plutella* test.—Solvent: 3 parts by weight acetone; emulsifier: 1 part by weight alkylaryl polyglycol ether.

To produce a suitable preparation of the particular active compound, 1 part by weight of such active compound is mixed with the stated amount of solvent containing the stated amount of emulsifier and the resulting concentrate is diluted with water to the desired final concentration.

Cabbage leaves (*Brassica oleracea*) are sprayed with the given active compound preparation until dew moist and are then infected with caterpillars of the diamond-back moth (*Plutella maculipennis*).

After the specified period of time, the degree of destruction is determined as a percentage: 100% means that all the caterpillars are killed whereas 0% means that none of the caterpillars are killed.

The particular active compounds tested, their concentrations, the evaluation time and the results obtained can be seen from the following Table 3:

TABLE 3

| Active compound (constitution) | Concentration of active compound in percent | Degree of destruction in percent after 3 days |
|---|---|---|
| (III$_3$) $\underset{C_2H_5O}{\overset{CH_3}{\diagdown}}\overset{S}{\overset{\|}{P}}-O-\underset{N}{\overset{N}{\diagup}}\underset{\diagdown N}{}$ | 0.1<br>0.01 | 100<br>100 |
| (IV$_3$) $\underset{C_2H_5O}{\overset{C_2H_5}{\diagdown}}\overset{S}{\overset{\|}{P}}-O-\underset{N}{\overset{N}{\diagup}}\underset{\diagdown N}{}$ | 0.1<br>0.01<br>0.001 | 100<br>100<br>100 |
| (VI$_2$) $(C_2H_5O)_2\overset{S}{\overset{\|}{P}}-O-\underset{N}{\overset{N}{\diagup}}\underset{\diagdown N}{}$ | 0.1<br>0.01<br>0.001 | 100<br>100<br>85 |
| (V$_3$) $(C_2H_5O)_2\overset{O}{\overset{\|}{P}}-O-\underset{N}{\overset{N}{\diagup}}\underset{\diagdown N}{}$ | 0.1<br>0.01<br>0.001 | 100<br>100<br>90 |

The following further examples illustrate, without limitation, the process for producing the particular new compounds of the present invention.

EXAMPLE 4

$$\text{(V}_4\text{)}$$

A mixture of 45 g. (0.3 mol) 3-hydroxy-benzo-1,2,4-triazine, 42 g. potassium carbonate and 750 ml. acetonitrile is heated to the boil for 1 hour. 52 g. O,O-diethylphosphoric acid ester chloride are then added dropwise to the reaction mixture at boiling temperature; the latter is heated for a further 3 hours under reflux, and the mixture is cooled and poured into water. The product separating in oil form is taken up in benzene, the benzene solution is washed with 1 N KOH and then washed several times with water, the organic phase is dried over sodium sulfate and freed from solvent under reduced pressure. By recrystallization of the residue from a benzene-ligroin mixture there are obtained 76 g. (90% of the theory) of O,O-diethyl-O-(benzo-1,2,4-triazin-3-yl)-phosphoric acid ester of melting point 46 to 47° C.

*Analysis.*—Calculated for $C_{11}H_{14}N_3O_4P$ (molecular weight 283.2) (percent): N, 14.83; P, 10.96. Found (percent): N, 14.93; P, 11.19.

EXAMPLE 5

$$\text{(VI}_3\text{)}$$

44 g. (0.3 mol) 3-hydroxy-benzo-1,2,4-triazine and 31 g. triethyl amine are dissolved at 50 to 60° C. in 100 ml. dimethyl formamide, and 57 g. (0.3 mol) O,O-diethyl-thionophosphoric acid ester chloride are added to this solution. After the exothermic reaction which sets in has subsided (the reaction is caused to proceed at 60 to 70° C. by mild external cooling of the vessel), the mixture is stirred for a further 2 hours at this temperature. The working up of the reaction mixture takes place as described in the case of Example 4. 64 g. (75% of the theory) of O,O-diethyl-O-(benzo-1,2,4-triazin-3-yl)-thionophosphoric acid ester are obtained as semi-solid product which, after recrystallization from a benzene/petroleum ether mixture, melts at 56° C.

Analysis.—Calculated for $C_{11}H_{14}N_3O_3PS$ (molecular weight 299.3) (percent): N, 14.04; P, 10.35; S, 10.7. Found (percent): N, 13.65; P, 10.22; S, 10.44.

EXAMPLE 6

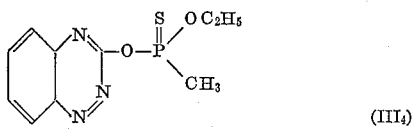

(III₄)

In manner analogous to that described in Example 4, from 44 g. (0.3 mol) 3-hydroxy-benzo-1,2,4-triazine, 42 g. potassium carbonate and 48 g. methyl-thionophosphonic acid O-ethyl ester chloride in acetonitrile there are obtained 75 g. (93% of the theory) of methyl-thionophosphonic acid O-ethyl-O-(benzo - 1,2,4 - triazin-3-yl)ester of melting point 80° C.

Analysis.—Calculated for $C_{10}H_{12}N_3O_2PS$ (molecular weight 269.3) (percent): N, 15.60; P, 11.51; S, 11.01. Found (percent): N, 15.64; P, 11.67; S, 11.84.

EXAMPLE 7

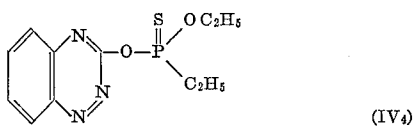

(IV₄)

As described in Example 4 or analogously as in Example 5, by reaction of 44 g. (0.3 mol) 3-hydroxy-benzo-1,2,4-triazine and 52 g. ethyl-thionophosphonic acid O-ethyl ester chloride there are obtained 43 g. (51% of the theory) of pure ethyl-thionophosphonic acid O-ethyl-O-(benzo-1,2,4-triazin-3-yl) ester of melting point 85° C. (from benzene-ligroin).

Analysis.—Calculated for $C_{11}H_{14}N_3O_2PS$ (molecular weight 283.3) (percent): N, 14.83; P, 10.94; S, 11.32. Found (percent): N, 14.83; P, 10.90; S, 11.56.

EXAMPLE 8

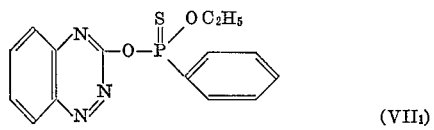

(VII₁)

According to the method of Example 4, from 44 g. (0.3 mol) 3-hydroxy-benzo-1,2,4-triazine and 66 g. (0.3 mol) phenyl-thionophosphonic acid O-ethyl ester chloride there are obtained 65 g. (65% of the theory) of the phenyl-thionophosphonic acid O-ethyl-O-(benzo-1,2,4-triazin-3-yl)ester with the refractive index $n_D^{25}$=1.6235.

Advantageously, in accordance with the present invention, in the foregoing formulae:

R represents:

alkyl having 1–4 carbon atoms such as methyl to tert.-butyl inclusive, especially methyl, ethyl, n- and iso-propyl, n-, iso- and s-butyl, and the like, and more particularly alkyl having 1–3 or 1–2 carbon atoms, preferably ethyl;

R' represents:

alkyl having 1–4 carbon atoms such as methyl to tert.-butyl inclusive as defined above, and more particularly alkyl having 1–3 or 1–2 carbon atoms; or alkoxy having 1–4 carbon atoms such as methoxy to tert.-butoxy inclusive, especially methoxy, ethoxy, n- and iso-propoxy, n-, iso- and s-butoxy, and the like, and more particularly alkoxy having 1–3 or 1–2 carbon atoms, preferably ethoxy; or phenyl; and X represents:

oxygen or sulfur, especially sulfur.

Preferably, R is $C_{1-3}$ alkyl, R' is $C_{1-3}$ alkyl or $C_{1-3}$ alkoxy; and X is oxygen or sulfur, most preferably sulfur. In particular, R is methyl or ethyl, R' is methyl, ethyl, methoxy or ethoxy; and X is oxygen or sulfur, especially sulfur.

The instant compounds particularly contemplate $C_{1-4}$ alkyl-O-$C_{1-4}$ alkyl- and O,O-di-$C_{1-4}$ alkyl-O-(benzo-1,2,4-triazin-3-yl)-phosphoric and thiono-phosphoric (-phosphonic) acid esters.

It will be realized that all of the foregoing compounds contemplated by the present invention possess the desired selective pesticidal, especially arthropodicidal, i.e., insecticidal or acaricidal, properties for combating insects and acarids, and that such compounds have not only a very slight toxicity toward warm-blooded creatures, but also a concomitantly low phytotoxicity.

As may be used herein, i.e., both in the specification and claims, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

What is claimed is:

1. Phosphorus-acid ester of benzo-1,2,4-triazine having the formula

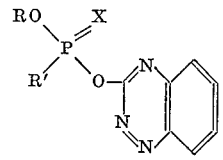

in which R is alkyl having 1–4 carbon atoms, R' is selected from the group consisting of alkyl having 1–4 carbon atoms, alkoxy having 1–4 carbon atoms and phenyl, and X is selected from the group consisting of oxygen and sulfur.

2. Ester according to claim 1 wherein R is $C_{1-3}$ alkyl, R' is selected from the group consisting of $C_{1-3}$ alkyl and $C_{1-3}$ alkoxy, and X is selected from the group consisting of oxygen and sulfur.

3. Ester according to claim 1 wherein R is $C_{1-3}$ alkyl, R' is $C_{1-3}$ alkoxy, and X is selected from the group consisting of oxygen and sulfur.

4. Ester according to claim 1 wherein R is $C_{1-3}$ alkyl, R' is $C_{1-3}$ alkyl, and X is sulfur.

5. Ester according to claim 1 wherein such compound is methyl - O - ethyl - O - (benzo - 1,2,4 - triazin - 3 - yl)-thionophosphonic acid ester having the formula

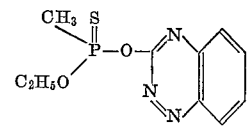

6. Ester according to claim 1 wherein such compound is ethyl - O - ethyl - O - (benzo - 1,2,4 - triazin - 3 - yl)-thionophosphonic acid ester having the formula

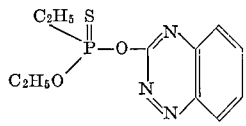

7. Ester according to claim 1 wherein such compound is O,O - diethyl - O - (benzo - 1,2,4 - triazin - 3 - yl) phosphoric acid ester having the formula

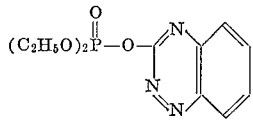

8. Ester according to claim 1 wherein such compound is O,O - diethyl - O - (benzo - 1,2,4 - triazin - 3 - yl)-thionophosphoric acid ester having the formula

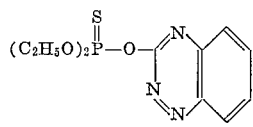

9. Ester according to claim 1 wherein such compound is phenyl - O - ethyl - O - (benzo - 1,2,4 - triazin - 3 - yl)-thionophonic acid ester having the formula

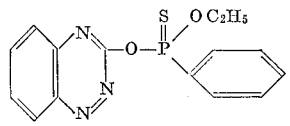

References Cited

UNITED STATES PATENTS

| | | | |
|---|---|---|---|
| 2,489,353 | 11/1949 | Wolf et al. | 260—248 |
| 2,489,358 | 11/1949 | Wolf et al. | 260—248 |

OTHER REFERENCES

Jiu et al.: J. Org. Chem., vol. 24, pp. 813–8 (1959).

HENRY R. JILES, Primary Examiner
J. M. FORD, Assistant Examiner

U.S. Cl. X.R.

424—249